(12) United States Patent
Trost et al.

(10) Patent No.: US 10,207,539 B2
(45) Date of Patent: Feb. 19, 2019

(54) VEHICLE SPINDLE AND A METHOD OF ATTACHING THE SPINDLE TO A PORTION OF AN AXLE HOUSING

(71) Applicant: Dana Heavy Vehicle Systems Group, LLC, Maumee, OH (US)

(72) Inventors: Harry W. Trost, Royal Oak, MI (US); Steven G. Slesinski, Ann Arbor, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 93 days.

(21) Appl. No.: 15/420,950

(22) Filed: Jan. 31, 2017

(65) Prior Publication Data

US 2018/0215200 A1    Aug. 2, 2018

(51) Int. Cl.
*B60B 35/16* (2006.01)
*B60B 35/12* (2006.01)
(Continued)

(52) U.S. Cl.
CPC .......... *B60B 35/16* (2013.01); *B23K 15/0053* (2013.01); *B23K 26/28* (2013.01); *B23K 31/02* (2013.01); *B60B 27/0052* (2013.01); *B60B 27/0057* (2013.01); *B60B 35/00* (2013.01); *B60B 35/122* (2013.01); *B60K 17/36* (2013.01); *F16C 3/02* (2013.01); *F16C 19/548* (2013.01); *F16C 35/063* (2013.01); *F16C 35/067* (2013.01); *F16C 35/12* (2013.01); *B23K 2101/006* (2018.08); *B23K 2101/06* (2018.08); *B60B 27/06* (2013.01); *B60B 2310/226* (2013.01); *B60B 2310/234* (2013.01); *B60B 2310/302* (2013.01); *B60B 2310/3026* (2013.01); *B60B 2310/3027* (2013.01);
(Continued)

(58) Field of Classification Search
CPC ... B60B 35/16; B60B 35/122; B60B 2320/10; B60B 2320/3027; B60B 2320/3026; B60B 2900/113; B60B 2310/3026; B60B 2310/302; B60B 2310/234; B60B 2900/112; B23K 26/28; B23K 15/0053; Y10T 29/497; Y10T 29/49707; Y10T 29/49696; Y10T 29/49995
USPC .............................. 301/131, 132, 135, 124.1
See application file for complete search history.

(56) References Cited

U.S. PATENT DOCUMENTS 4,768,839 A    9/1988  Spindler
6,308,882 B1   10/2001 Shuster et al.
(Continued)

*Primary Examiner* — S. Joseph Morano
*Assistant Examiner* — Jean W Charleston
(74) *Attorney, Agent, or Firm* — Marshall & Melhorn, LLC

(57) ABSTRACT

A vehicle spindle and a method of attaching the spindle to a portion of an axle half shaft housing. The spindle has an inner surface, an outer surface, one or more bearing journals on the outer surface of the spindle and a radially protruding portion circumferentially extending from at least a portion of the outer surface of an axially inboard end portion of the spindle. Prior to attaching the spindle to the axle half shaft housing, the one or more bearing journals are ground, a clocking angle for the radially protruding portion of the spindle is determined and the spindle is aligned to the determined clocking angle. Once the spindle is aligned to the determined clocking angle, the axially inboard end portion of the spindle is attached to an axially outboard end portion of the axle half shaft housing using one or more welds.

19 Claims, 7 Drawing Sheets

(51) Int. Cl.
| | |
|---|---|
| *B60B 27/00* | (2006.01) |
| *B23K 15/00* | (2006.01) |
| *B23K 26/28* | (2014.01) |
| *B23K 31/02* | (2006.01) |
| *B60K 17/36* | (2006.01) |
| *B60B 35/00* | (2006.01) |
| *F16C 35/063* | (2006.01) |
| *F16C 35/067* | (2006.01) |
| *F16C 35/12* | (2006.01) |
| *F16C 3/02* | (2006.01) |
| *F16C 19/54* | (2006.01) |
| *F16D 51/00* | (2006.01) |
| *B60B 27/06* | (2006.01) |
| *F16C 33/58* | (2006.01) |
| *B23K 101/00* | (2006.01) |
| *B23K 101/06* | (2006.01) |

(52) U.S. Cl.
CPC ....... *B60B 2310/54* (2013.01); *B60B 2320/10* (2013.01); *B60B 2900/112* (2013.01); *B60B 2900/113* (2013.01); *B60B 2900/115* (2013.01); *B60Y 2410/10* (2013.01); *F16C 33/581* (2013.01); *F16C 2326/06* (2013.01); *F16D 2051/003* (2013.01); *F16D 2250/0076* (2013.01)

(56) References Cited

U.S. PATENT DOCUMENTS

| | | | |
|---|---|---|---|
| 6,431,659 B1 * | 8/2002 | Somppi | B62D 17/00 301/131 |
| 6,439,672 B1 * | 8/2002 | Simon | B60B 35/04 301/124.1 |
| 6,572,199 B1 * | 6/2003 | Creek | B60B 35/08 301/124.1 |
| 6,641,239 B2 * | 11/2003 | Kaiser | F25D 25/025 312/331 |
| 7,043,818 B2 | 5/2006 | Gustafsson et al. | |
| 7,090,309 B2 * | 8/2006 | Blessing | B60B 35/04 301/124.1 |
| 7,328,908 B2 * | 2/2008 | Barber | B21D 53/88 180/905 |
| 7,465,247 B2 | 12/2008 | Bock | |
| 8,262,491 B2 | 9/2012 | Burgbacher et al. | |
| 8,562,478 B2 | 10/2013 | Groebel | |
| 9,103,427 B2 | 8/2015 | Downs et al. | |
| 2002/0198075 A1 | 12/2002 | Prucher | |
| 2006/0153482 A1 | 7/2006 | Koike et al. | |
| 2007/0132307 A1 | 6/2007 | Fahrenholz et al. | |
| 2007/0199763 A1 | 8/2007 | Henze et al. | |
| 2007/0246286 A1 | 10/2007 | Henze | |
| 2009/0266198 A1 | 10/2009 | Nosakowski | |
| 2016/0076610 A1 | 3/2016 | White et al. | |

\* cited by examiner

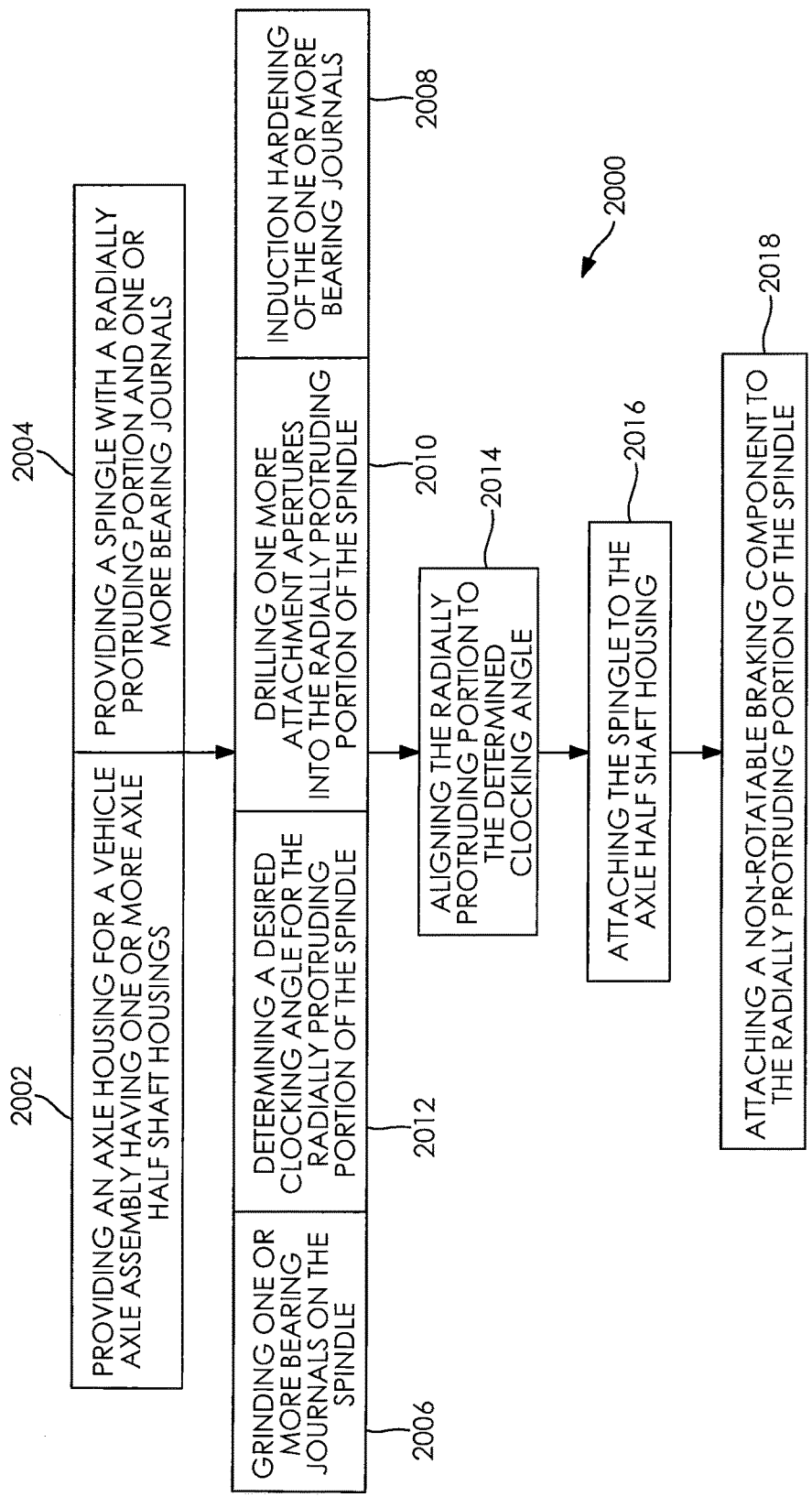

VEHICLE SPINDLE AND A METHOD OF ATTACHING THE SPINDLE TO A PORTION OF AN AXLE HOUSING

FIELD OF THE DISCLOSURE

The present disclosure relates to a vehicle spindle and a method of attaching the spindle to a portion of an axle housing of a motor vehicle.

BACKGROUND OF THE DISCLOSURE

Conventional drive axle housings incorporate the use of a spindle as part of the suspension system that carries a wheel hub. The spindle is typically attached to an end of the drive axle housing using a friction welding process. During the friction welding process the spindle is spun at high speeds while in contact with the drive axle housing to generate an amount of mechanical friction between the two components. Once there is a sufficient amount of mechanical friction between the spindle and the drive axle housing, a lateral force is applied to plastically displace and fuse the two components together. While the friction welding process itself is relatively fast in comparison to other welding techniques, the friction welding process adds additional time and complexity to the overall assembly process for the drive axle assembly.

For instance, the friction welding process adds additional time and complexity to aligning the braking assembly to the desired clocking angle. As the spindle begins to slow down, its final resting angular position is random. While there is additional equipment that can be purchased to aid in stopping the spindle at the desired clocking angle it adds additional time, complexity and expense to the overall assembly process for the drive axle assembly. I would therefore be advantageous to develop a method of attaching a vehicle spindle to a drive axle housing that reduces the overall time, complexity and cost related to the overall assembly of the drive axle assembly.

The friction welding process requires the incorporation of a post welding straightening process when the spindle is not stopped at the desired clocking angle. Additionally, a post welding straightening process is needed when the friction welding process results in a distortion in the drive axle geometry. It would therefore be advantageous to develop a method of attaching a vehicle spindle to a drive axle housing that eliminates the need for a post welding straightening process and therefore reduces the overall time, complexity and cost related to the overall assembly of the drive axle assembly.

SUMMARY OF THE DISCLOSURE

A vehicle spindle and a method of attaching the spindle to a portion of an axle half shaft housing. The method includes first providing a spindle and an axle half shaft housing. The spindle has an inner surface, an outer surface, one or more bearing journals on the outer surface of the spindle and a radially protruding portion circumferentially extending from at least a portion of the outer surface of an axially inboard end portion of the spindle. Prior to attaching the spindle to the axle half shaft housing, the one or more bearing journals are ground, a clocking angle for the radially protruding portion of the spindle is determined and the spindle is aligned to the determined clocking angle. Once the spindle is aligned to the determined clocking angle, the axially inboard end portion of the spindle is attached to an axially outboard end portion of the axle half shaft housing using one or more welds.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 8 is a flow-chart illustrating the method of attaching a spindle to an axle half haft housing according to an embodiment of the disclosure.

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments of the invention disclosed are not to be considered as limiting, unless expressly stated otherwise.

It is within the scope of this disclosure, and as a non-limiting example, that the vehicle spindle disclosed herein may be used in automotive, off-road vehicle, all-terrain vehicle, construction, structural, marine, aerospace, locomotive, military, machinery, robotic and/or consumer product applications. Additionally, as a non-limiting example, the vehicle spindle disclosed herein may also be used in passenger vehicle, electric vehicle, hybrid vehicle, commercial vehicle, autonomous vehicles, semi-autonomous vehicles and/or heavy vehicle applications.

Figure 1:
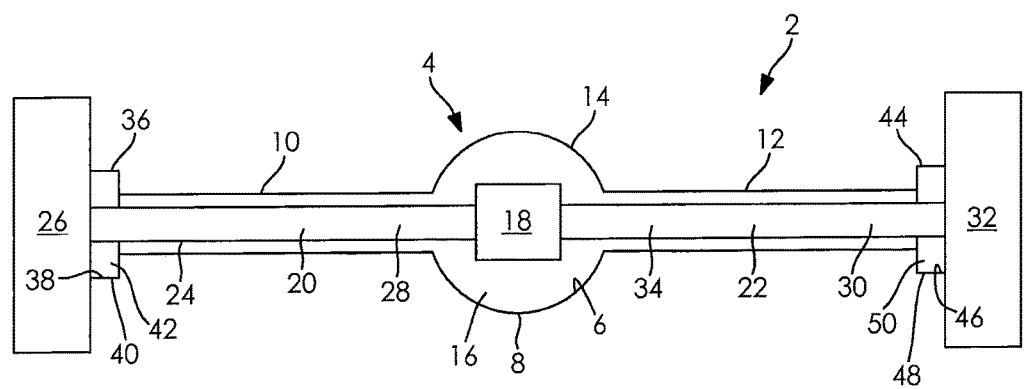
FIG. 1 is a schematic side-view of an axle assembly having a spindle according to an embodiment of the disclosure.

FIG. 1 is a schematic side-view of a vehicle axle assembly 2 having one or more spindles according to an embodiment of the disclosure. As a non-limiting example, the vehicle axle assembly 2 is a forward axle assembly, a rear axle assembly, a forward tandem axle assembly and/or a rear tandem axle assembly. The vehicle axle assembly 2 includes an axle housing 4 having an inner surface 6, and outer surface 8, a first axle half shaft housing 10, a second axle half shaft housing 12 and a central banjo portion 14 that is disposed between the first axle half shaft housing 10 and the second axle half shaft housing 12. The inner surface 6 and the outer surface 8 of the axle housing 4 defines a hollow portion 16 therein. According to an embodiment of the disclosure and as a non-limiting example, the first axle half shaft housing 10 and the second axle half shaft housing 12 of the axle housing 4 are integrally formed as part of the central banjo portion 14 of the axle housing 4. In accordance with an alternative embodiment of the disclosure and as a non-limiting example, the first axle half shaft housing 10 and the second axle half shaft housing 12 of the axle housing 4 are connected to the central banjo portion 14 of the axle housing 4 by using a threaded connection, one or more adhesives, one or more snap rings, one or more mechanical fasteners, one or more welds and/or any other method of connecting one portion of a vehicle axle housing to another. As a non-limiting example, the axle housing 4 of the vehicle axle assembly 2 is a forward axle housing, a rear axle housing, a forward tandem axle and/or a rear tandem axle housing.

Disposed within the hollow portion 16 of the central banjo portion 14 of the axle housing 4 of the vehicle axle assembly 2 is a differential assembly 18. As a non-limiting example, the differential assembly 18 is a forward axle differential, a rear axle differential, a forward tandem axle differential, an inter-axle differential and/or a rear tandem axle differential. The differential assembly 18 is a set of gears that receives an amount of rotational energy from a source of rotational energy (not shown) and allows the outer drive wheel(s) of the vehicle axle assembly 2 to rotate at a faster rate than the inner drive wheel(s) of the vehicle axle assembly 2. As a non-limiting example, the source of rotational energy (not shown) is an internal combustion engine, an electric motor, a turbine, a gas turbine, a steam turbine, a steam engine and/or an external combustion engine. The rotational energy is transmitted through the vehicle axle assembly 2 as described in more detail below.

The vehicle axle assembly 2 includes a first axle half shaft 20 and a second axle half shaft 22. A first end portion 24 of the first axle half shaft 20 is drivingly connected to a first wheel assembly 26 and a second end portion 28 of the first axle half shaft 20 is drivingly connected to an end of the differential assembly 18. As illustrated in FIG. 1 of the disclosure, the first axle half shaft 20 is at least partially disposed within the hollow portion 16 of the first axle half shaft housing 10 of the axle housing 4 of the vehicle axle assembly 2. As a non-limiting example, the first axle half shaft 20 is a first front axle half shaft, a first rear axle half shaft, a first forward tandem axle half shaft and/or a first rear tandem axle half shaft. Additionally as a non-limiting example, the second end 28 of the first axle half shaft 20 is drivingly connected to a differential side gear, a separate stub shaft, a separate coupling shaft, a first axle half shaft axle disconnect system, a first differential output shaft and/or a shaft that is formed as part of a differential side gear.

A first end portion 30 of the second axle half shaft 22 is drivingly connected to a second wheel assembly 32 and a second end portion 34 of the second axle half shaft 22 is drivingly connected to an end of the differential assembly 18 opposite the first axle half shaft 20. As illustrated in FIG. 1 of the disclosure, the second axle half shaft 22 is at least partially disposed within the hollow portion 16 of the second axle half shaft housing 12 of the axle housing 4 of the vehicle axle assembly 2. As a non-limiting example, the second axle half shaft 22 is a second front axle half shaft, a second rear axle half shaft, a second forward tandem axle half shaft and/or a second rear tandem axle half shaft. Additionally as a non-limiting example, the second end 34 of the second axle half shaft 22 is drivingly connected to a differential side gear, a separate stub shaft, a separate coupling shaft, a second axle half shaft axle disconnect system, a second differential output shaft and/or a shaft that is formed as part of a differential side gear.

Integrally connected to an end of the first axle half shaft housing 10 opposite the central banjo portion 14 of the axle housing 4 is a first spindle 36 according to an embodiment of the disclosure. The first spindle 36 has an inner surface 38 and an outer surface 40 defining a hollow portion 42 therein. At least a portion of an end of the first spindle 36 opposite the first axle half shaft housing 10 provides rotational support for at least a portion of the first wheel assembly 26. As illustrated in FIG. 1 of the disclosure, at least a portion of the second end portion 24 of the first axle half shaft 20 is disposed within the hollow portion 42 of the first spindle 36.

A second spindle 44 according to an embodiment of the disclosure is integrally connected to an end of the second axle half shaft housing 12 opposite the central banjo portion 14 of the axle housing 4. The second spindle 44 has an inner surface 46 and an outer surface 48 defining a hollow portion 50 therein. At least a portion of an end of the second spindle 44 opposite the second axle half shaft housing 12 provides rotational support for at least aportion of the second wheel assembly 32. As illustrated in FIG. 1 of the disclosure, at least a portion of the second end portion 30 of the second axle half shaft 22 is disposed within the hollow portion 50 of the second spindle.

Figure 2:
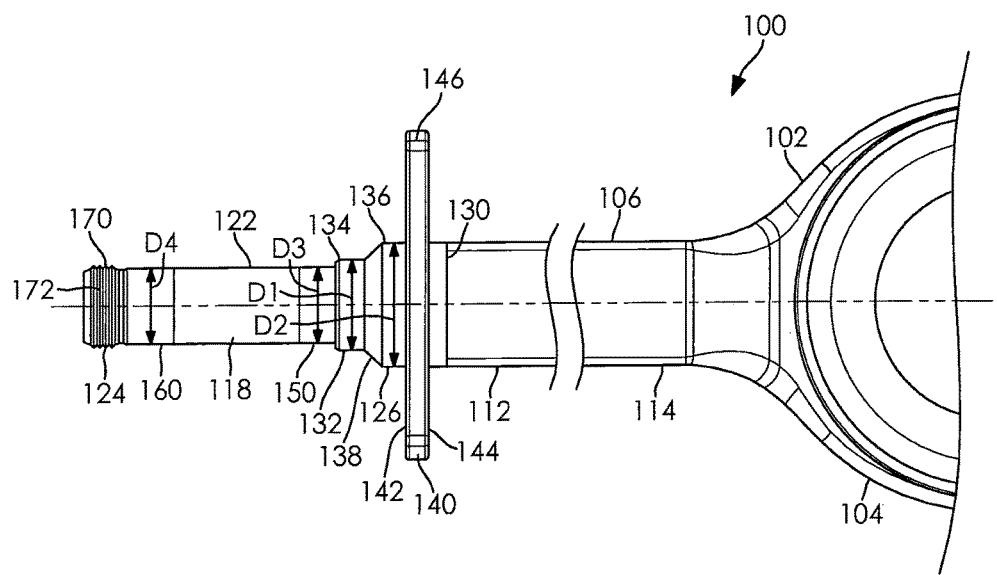
FIG. 2 is a schematic side-view of an axle assembly having one or more spindles according to an embodiment of the disclosure.
Figure 2A:
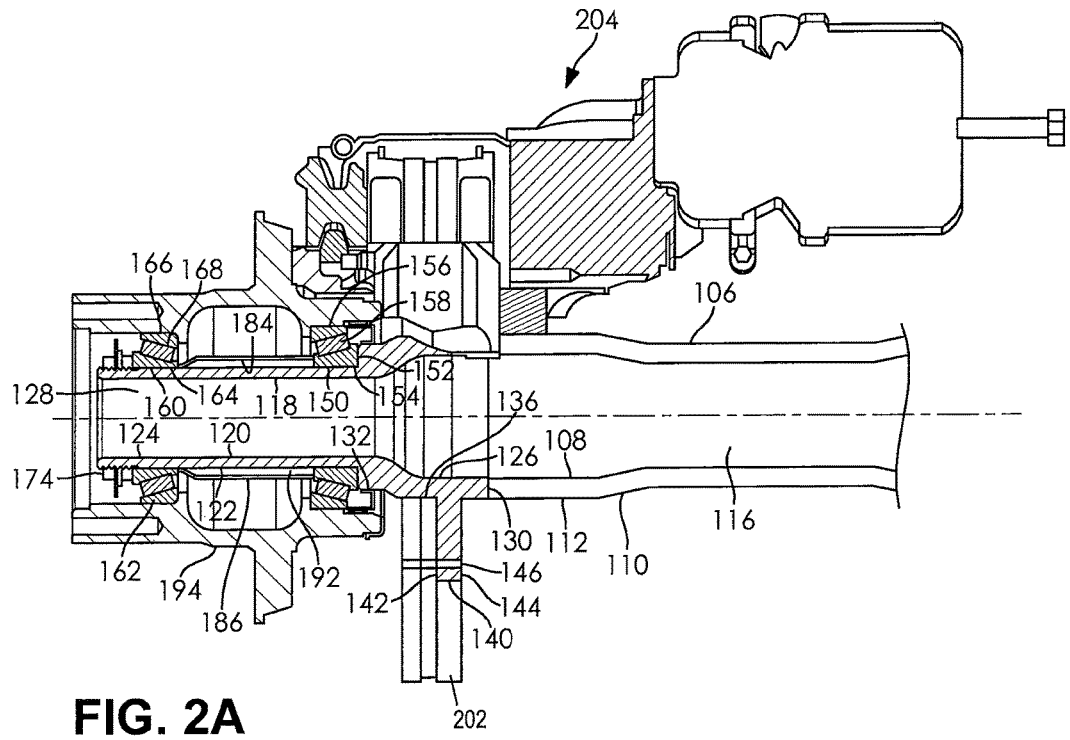
FIG. 2A is a cut-away schematic side-view of the one or more spindles illustrated in FIG. 2 connected to a wheel end assembly according to an embodiment of the disclosure.
Figure 2B:
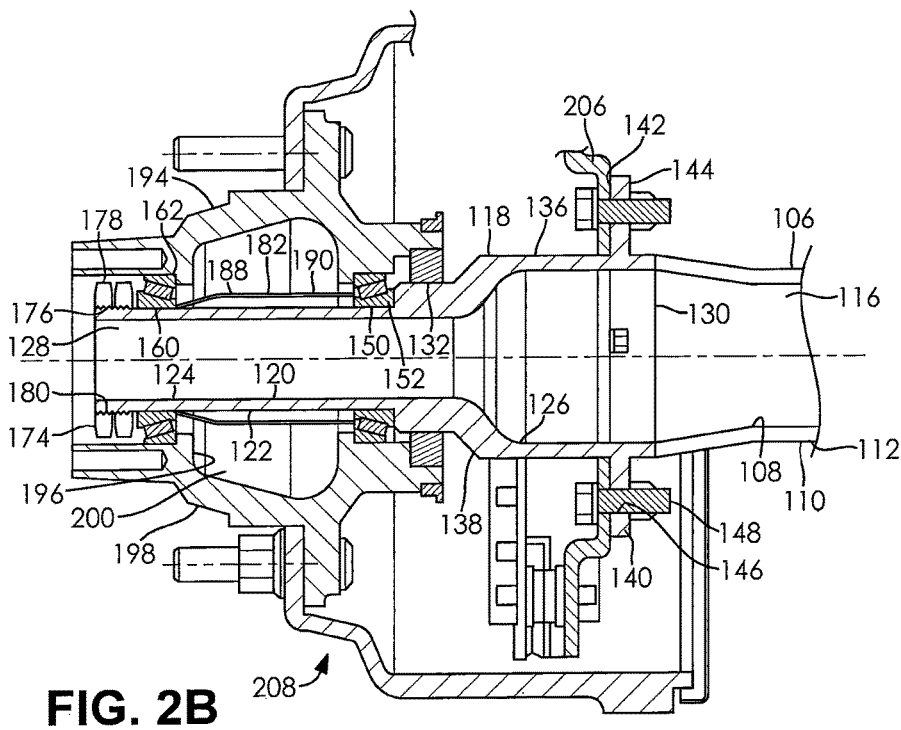
FIG. 2B is a cut-away schematic side-view of the one or more spindles illustrated in FIGS. 2 and 2A connected to a wheel end assembly according to an alternative embodiment of the disclosure.

FIGS. 2, 2A and 2B of the disclosure illustrate an axle assembly 100 having one or more spindles 118 according to an embodiment of the disclosure. As illustrated in FIGS. 2-2B of the disclosure, the axle assembly 100 includes an axle housing 102 having a central banjo portion 104 and one or more axle half shaft housings 106.

The one or more axle half shaft housings have an inner surface 108 an outer surface 110, an axially outboard end portion 112 and an axially inboard end portion 114. The inner surface 108 and the outer surface 110 of the one or more axle half shaft housings 106 defines a hollow portion 116 therein. As illustrated in FIG. 2 of the disclosure, at least a portion of the axially inboard end portion 114 of the one or more axle half shaft housings 106 is integrally connected to a portion of the central banjo portion 104 of the axle housing 102 of the axle assembly 100. According to an embodiment of the disclosure and as a non-limiting example, at least a portion of the axially inboard end portion 114 of the one or more axle half shaft housings 106 are integrally formed as part of the central banjo portion 104 of the axle housing 102. In accordance with an alternative embodiment of the disclosure and as a non-limiting example, the one or more axle half shaft housings 106 are integrally connected to at least a portion of the central banjo portion 104 by using one or more welds, a threaded connection, one or more adhesives, one or more mechanical fasteners and/or any other method of connecting the central banjo portion of an axle housing to one or more axle half shaft housings. As a non-limiting example, the one or more welds are a gas metal arc welding process, a laser beam welding process, an electron beam welding process and/or an x-ray welding process.

Disposed axially outboard from and extending co-axially with the axially outboard end portion 112 of the one or more axle half shaft housings 106 is the one or more spindles 118 according to an embodiment of the disclosure. As illustrated in FIGS. 2-2B of the disclosure, the one or more spindles 118 have an inner surface 120, an outer surface 122, an axially outboard end portion 124 and an axially inboard end portion 126. The inner surface 120 and the outer surface 122 of the one or more spindles 118 defines a hollow portion 128 therein. At least a portion of the axially inboard end portion 126 of the one or more spindles 118 is integrally connected to at least a portion of the axially outboard end portion 112 of the one or more axle half shaft housings 106. According to an embodiment of the disclosure and as a non-limiting example, the axially inboard end portion 126 of the one or more spindles 118 are connected to the axially outboard end portion 112 of the one or more axle half shaft housings 106 by using one or more welds 130. As a non-limiting example, the one or more welds 130 are one or more gas metal arc welds and/or one or more energy beam welds such as a laser beam weld, an electron beam weld and/or an x-ray weld.

Extending from at least a portion of the axially inboard end portion 126 of the one or more spindles 118 is a first increased diameter portion 132. An axially outboard end of the first increased diameter portion 132 of the one or more spindles 118 is a chamfered portion 134.

Disposed adjacent to and axially inboard from the first increased diameter portion 132 of the axially inboard end portion 126 of the one or more spindles 118 is a second increased diameter portion 136. As illustrated in FIGS. 2, 2A and 2B of the disclosure, the first increased diameter portion 132 on the axially inboard end portion 126 of the one or more spindles 118 has a diameter D1 and the second increased diameter portion 136 of the one or more spindles 118 has a diameter D2. According to an embodiment of the disclosure, the diameter D1 of the first increased diameter portion 132 of the one or more spindles 118 is smaller than the diameter D2 of the second increased diameter portion 136 of the one or more spindles 118.

Connecting an axially inboard end of the first increased diameter portion 132 of the one or more spindles 118 to an axially outboard end of the second increased diameter portion 136 of the one or more spindles 118 is an increasing diameter portion 138. As illustrated in FIGS. 2, 2A and 2B of the disclosure, the diameter of the increasing diameter portion 138 increases from the first increased diameter portion 132 to the second increased diameter portion 138 of the one or more spindles 118.

A radially protruding portion 140 having an axially outboard surface 142 and an axially inboard surface 144 circumferentially extends radially outboard from at least a portion of the second increased diameter portion 138 of the one or more spindles 118. As a non-limiting example, the radially protruding portion 140 is a brake flange. In accordance with an embodiment of the disclosure, the radially protruding portion 140 includes one or more attachment apertures 146 that extend from the axially outboard side 142 to the axially inboard side 144 of the radially protruding portion 140. The one or more attachment apertures 146 are of a size and a shape to receive and/or retain at least a portion of one or more mechanical fasteners 148.

Disposed axially outboard from and adjacent to the first increased diameter portion 132 of the one or more spindles 118 is a first bearing journal 150. Radially outboard from and adjacent to the first bearing journal 150 is a first bearing 152. As illustrated in FIGS. 2A and 2B of the disclosure, the first bearing 152 has an inner face 154, an outer race 156 and a plurality of rolling elements 158 disposed between the inner race 154 and the outer race 156 of the first bearing 152. At least a portion of the inner race 154 of the first bearing 150 is in direct contact with the first bearing journal 150 of the one or more spindles 118 of the axle assembly 100. As a non-limiting example, the first bearing 152 is a wheel bearing and/or a tapered roller bearing. In accordance with an embodiment of the disclosure (not shown), at least a portion of the first bearing journal of the one or more spindles forms at least a portion of the inner race of the first bearing.

Axially outboard from the first bearing journal 150 on the axially outboard end portion 124 of the one or more spindles 118 is a second bearing journal 160. Disposed radially outboard from and adjacent to the second bearing journal 160 of the one or more spindles 118 is a second bearing 162. As illustrated in FIGS. 2A and 2B of the disclosure, the second bearing 162 has an inner race 164, an outer race 166 and a plurality of rolling elements 168 disposed between the inner race 164 and the outer race 166 of the second bearing 162. As a non-limiting example, the second bearing 162 is a wheel bearing and/or a tapered roller bearing. In accordance with an embodiment of the disclosure (not shown), at least a portion of the second bearing journal of the one or more spindles forms at least a portion of the inner race of the second bearing.

As illustrated in FIGS. 2, 2A and 2B of the disclosure, the first bearing journal 150 of the one or more spindles 118 has a diameter D3 and the second bearing journal 160 of the one or more spindles 118 has a diameter D4. In accordance with an embodiment of the disclosure and as a non-limiting example, the diameter D3 of the first bearing journal 150 is substantially the same as the diameter D4 of the second bearing journal 160 of the one or more spindles 118.

Axially outboard from the second bearing journal 160 on the axially outboard end portion 124 of the one or more spindles 118 is a threaded portion 170. Circumferentially extending from at least a portion of the outer surface 122 of the threaded portion 170 are threads 172 of a pre-determined pitch.

Disposed radially outboard from the threaded portion 170 of the axially outboard end portion 124 of the one or more spindles 118 is a spindle nut 174 having an inner surface 176 and an outer surface 178. Additionally, the spindle nut 174 is disposed axially outboard from and adjacent to the second bearing 162. Circumferentially extending from at least a portion of the inner surface 176 of the spindle nut 174 are threads 180 of a pre-determined pitch. The threads 180 on the inner surface 174 of the spindle nut 174 are complementary to the threads 172 on the outer surface 122 of the threaded portion 170 of the axially outboard end portion 124 of the one or more spindles 118. The spindle nut 174 is used to lock the first bearing 152, the second bearing 162, the bearing spacer 182 and the wheel hub 194 in place and keep the first bearing 152, the second bearing 162, the bearing spacer 182 and the wheel hub 194 from sliding off the one or more spindles 118 of the axle assembly 100.

Interposed between the first bearing 152 and the second bearing 162 is a bearing spacer 182 having an inner surface 184, an outer surface 186, an axially outboard end portion 188 and an axially inboard end portion 190. The inner surface 184 and the outer surface 186 of the bearing spacer 182 defines a hollow portion 192 therein. As illustrated in FIGS. 2A and 2B of the disclosure, at least a portion of the axially outboard end portion 188 of the bearing spacer 182 is in direct contact with at least a portion of the second bearing 162. Additionally, at least a portion of the axially inboard end portion 190 of the bearing spacer 182 is in direct contact with at least a portion of the first bearing 152. The bearing spacer 182 is used to ensure that the first and second bearing 152 and 162 are assembled in the correct location and remain in the desired location during operation.

Radially outboard from the one or more spindles 118 of the axle assembly 100 is one or more wheel hubs 194 having an inner surface 196 and an outer surface 198 defining a hollow portion 200 therein. As illustrated in FIGS. 2A and 2B of the disclosure, at least a portion of the outer race 156 of the first bearing 152 is in direct contact with at least a portion of the inner surface 196 of the one or more wheel hubs 194. Additionally, at least a portion of the outer race 166 of the second bearing 162 is in direct contact with the inner surface 196 of the one or more wheel hubs 194. The first and second bearing 152 and 162 of the axle assembly 100 allows for relative rotation between the one or more wheel hubs 194 and the one or more spindles 118 of the axle assembly 100.

According to the embodiment of the disclosure illustrated in FIG. 2A of the disclosure, at least a portion of the radially protruding portion 140 of the one or more spindles 118 is integrally connected to at least a portion of a torque plate 202 of a disc brake assembly 204. As a non-limiting example, the radially protruding portion 140 is integrally connected to the torque plate 202 by using one or more mechanical fasteners, one or more adhesives and/or one or more welds. In accordance with an embodiment of the disclosure and as a non-limiting example, the one or more welds are one or more gas metal arc welds and/or one or more energy beam welds such as a laser beam weld, an electron beam weld and/or an x-ray weld.

In accordance with an alternative embodiment of the disclosure illustrated in FIG. 2B, at least a portion of the radially protruding portion 140 is integrally connected to at least a portion of a brake spider 206 of a drum brake assembly 208. As a non-limiting example, the radially protruding portion 140 is integrally connected to the brake spider 206 by using one or more mechanical fasteners, one or more adhesives and/or one or more welds. In accordance with an embodiment of the disclosure and as a non-limiting example, the one or more welds are one or more gas metal arc welds and/or one or more energy beam welds such as a laser beam weld, an electron beam weld and/or an x-ray weld.

Figure 3:
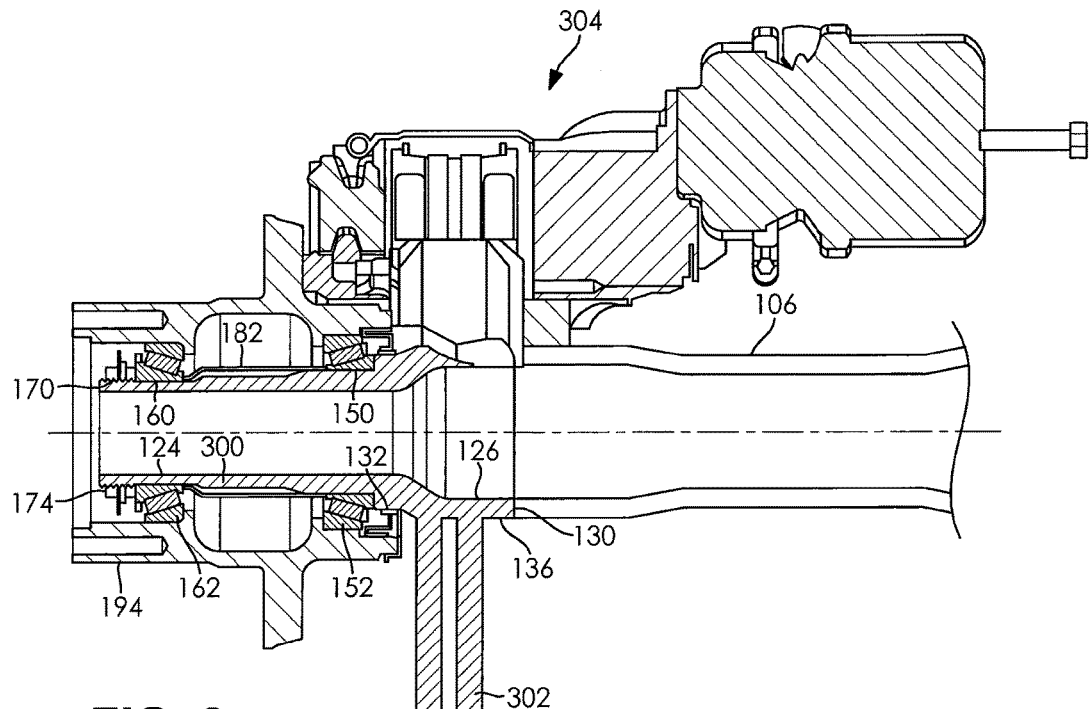
FIG. 3 is a cut-away schematic side-view of one or more spindles according to an alternative embodiment of the disclosure.

FIG. 3 is a cut-away schematic side-view of one or more spindles 300 according to an alternative embodiment of the disclosure. The one or more spindles 118 illustrated in FIGS. 2-2B of the disclosure are the same as the one or more spindles 300 illustrated in FIG. 3, except where specifically noted below. Circumferentially extending radially outboard from at least a portion of the second increased diameter portion 136 of the axially inboard end portion 126 of the one or more spindles 300 is a radially protruding portion 302 of a disc brake assembly 304. As a non-limiting example, the radially protruding portion 302 on the second increased diameter portion 136 of the one or more spindles 300 is a torque plate. In accordance with this embodiment of the disclosure, the one or more spindles 300 do not include the radially protruding portion 140 illustrated in FIGS. 2-2B of the disclosure.

Figure 4:
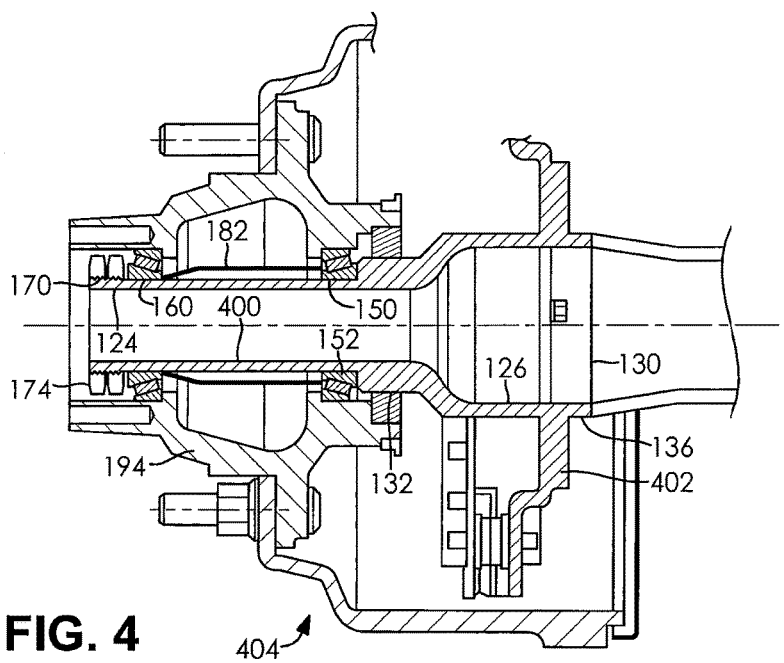
FIG. 4 is a cut-away schematic side-view of one or more spindles according to another alternative embodiment of the disclosure.

FIG. 4 is a cut-away schematic side-view of one or more spindles 400 according to another alternative embodiment of the disclosure. The one or more spindles 118 and 300 illustrated in FIGS. 2, 2A, 2B and 3 of the disclosure are the same as the one or more spindles 400 illustrated in FIG. 4, except where specifically noted below. Circumferentially extending radially outboard from at least a portion of the second increased diameter portion 136 of the axially inboard end portion 126 of the one or more spindles 400 is a radially protruding portion 402 of a drum brake assembly 404. As a non-limiting example, the radially protruding portion 402 on the second increased diameter portion 136 of the one or more spindles 400 is a brake spider. In accordance with this embodiment of the disclosure, the one or more spindles 400 do not include the radially protruding portions 140 and 302 illustrated in FIGS. 2, 2A, 2B and 3 of the disclosure.

Figure 5:
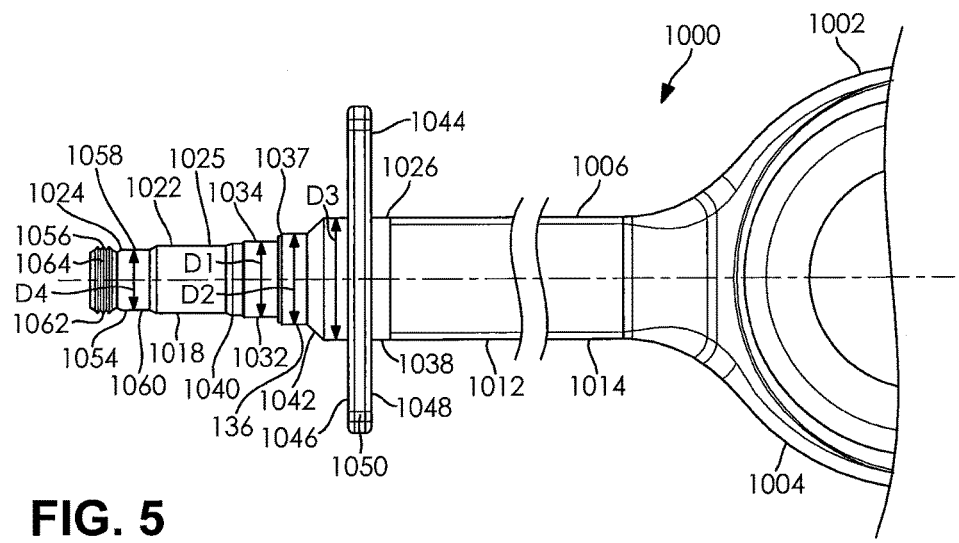
FIG. 5 is a schematic side-view of an axle assembly having one or more spindles according to yet another embodiment of the disclosure.
Figure 5A:
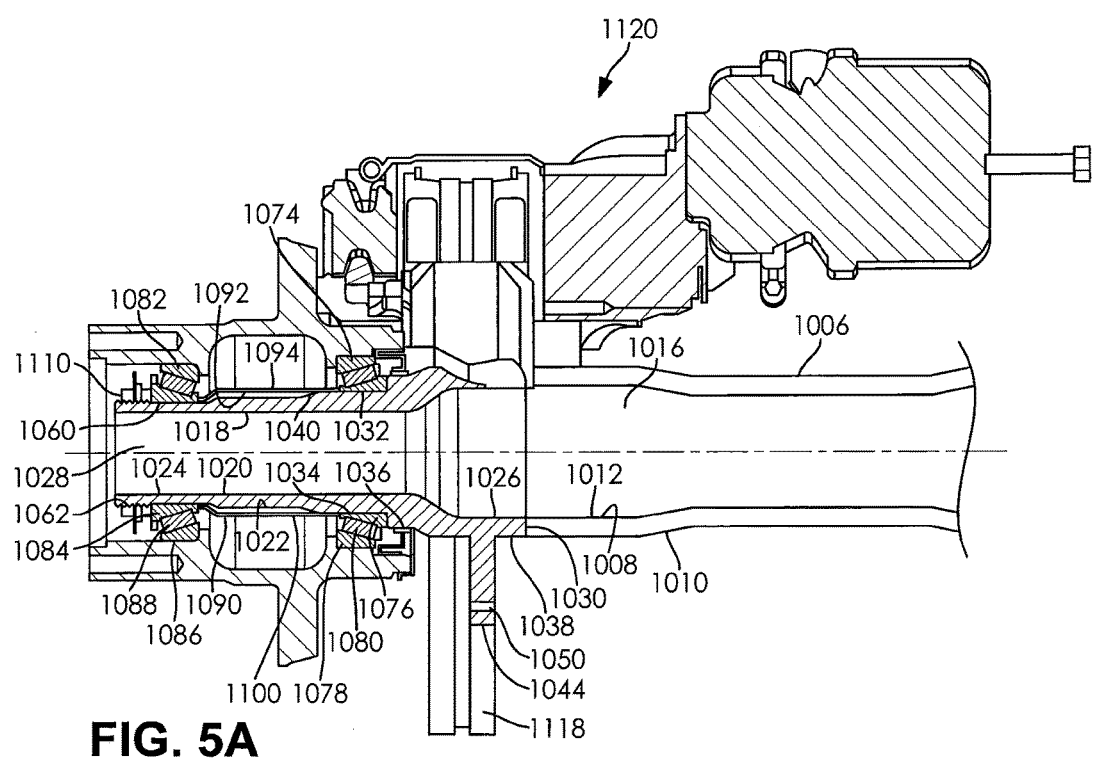
FIG. 5A is a cut-away schematic side-view of the one or more spindles illustrated in FIG. 5 connected to a wheel end assembly according to an embodiment of the disclosure.
Figure 5B:
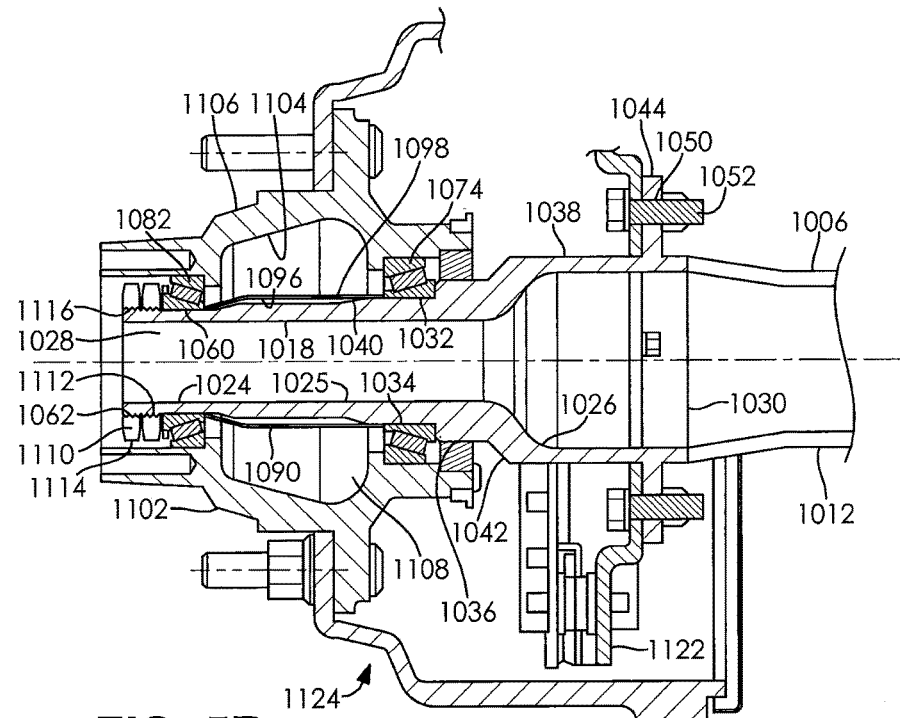
FIG. 5B is a cut-away schematic side-view of the one or more spindles illustrated in FIGS. 5 and 5A connected to a wheel end assembly according to an alternative embodiment of the disclosure.

FIGS. 5, 5A and 5B of the disclosure illustrate an axle assembly 1000 having one or more spindles 1018 according to an embodiment of the disclosure. As illustrated in FIGS. 5-5B of the disclosure, the axle assembly 1000 includes an axle housing 1002 having a central banjo portion 1004 and one or more axle half shaft housings 1006.

The one or more axle half shaft housings have an inner surface 1008 an outer surface 1010, an axially outboard end portion 1012 and an axially inboard end portion 1014. The inner surface 1008 and the outer surface 1010 of the one or more axle half shaft housings 1006 defines a hollow portion 1016 therein. As illustrated in FIG. 5 of the disclosure, at least a portion of the axially inboard end portion 1014 of the one or more axle half shaft housings 1006 is integrally connected to a portion of the central banjo portion 1004 of the axle housing 1002 of the axle assembly 1000. According to an embodiment of the disclosure and as a non-limiting example, at least a portion of the axially inboard end portion 1014 of the one or more axle half shaft housings 1006 are integrally formed as part of the central banjo portion 1004 of the axle housing 1002. In accordance with an alternative embodiment of the disclosure and as a non-limiting example, the one or more axle half shaft housings 1006 are integrally connected to at least a portion of the central banjo portion 1004 by using one or more welds, a threaded connection, one or more adhesives, one or more mechanical fasteners and/or any other method of connecting the central banjo portion of an axle housing to one or more axle half shaft housings. As a non-limiting example, the one or more welds are a gas metal arc welding process, a laser beam welding process, an electron beam welding process and/or an x-ray welding process.

Disposed axially outboard from and extending co-axially with the axially outboard end portion 1012 of the one or more axle half shaft housings 1006 is the one or more spindles 1018 according to an embodiment of the disclosure. As illustrated in FIGS. 5-5B of the disclosure, the one or more spindles 1018 have an inner surface 1020, an outer surface 1022, an axially outboard end portion 1024, an intermediate portion 1025 and an axially inboard end portion 1026. The inner surface 1020 and the outer surface 1022 of the one or more spindles 1018 defines a hollow portion 1028 therein. At least a portion of the axially inboard end portion 1026 of the one or more spindles 1018 is integrally connected to at least a portion of the axially outboard end portion 1012 of the one or more axle half shaft housings 1006. According to an embodiment of the disclosure and as a non-limiting example, the axially inboard end portion 1026 of the one or more spindles 1018 are connected to the axially outboard end portion 1012 of the one or more axle half shaft housings 1006 by using one or more welds 1030. As a non-limiting example, the one or more welds 1030 are one or more gas metal arc welds and/or one or more energy beam welds such as a laser beam weld, an electron beam weld and/or an x-ray weld.

Extending from at least a portion of the axially inboard end portion 1026 of the one or more spindles 1018 is a first increased diameter portion 1032. At least a portion of the outer surface 1022 of the first increased diameter portion 1032 of the axially inboard end portion 1026 of the one or more spindles 1018 is a first bearing journal 1034. As illustrated in FIGS. 5, 5A and 5B of the disclosure, the first increased diameter portion 1032 and the first bearing journal 1034 of the one or more spindles 1018 has a diameter D1.

Disposed adjacent to and axially inboard from the first increased diameter portion 1032 of the axially inboard end portion 1026 of the one or more spindles 1018 is a second increased diameter portion 1036. An axially outboard end of the second increased diameter portion 1036 of the one or more spindles 1018 is a chamfered portion 1037. As illustrated in FIGS. 5, 5A and 5B of the disclosure, the second increased diameter portion 1036 of the one or more spindles 1018 has a diameter D2.

Axially inboard from and adjacent to the second increased diameter portion 1036 of the axially inboard end portion 1026 of the one or more spindles 1018 is a third increased diameter portion 1038. As illustrated in FIGS. 5, 5A and 5B of the disclosure, the third increased diameter portion 1038 of the one or more spindles 1018 has a diameter D3. According to an embodiment of the disclosure, the diameter D2 of the second increased diameter portion 1036 is smaller than the diameter D3 of the third increased diameter portion 1038 of the one or more spindles 1018. Additionally, as illustrated in FIGS. 5, 5A and 5B of the disclosure, the diameter D1 of the first increased diameter portion 1032 of the one or more spindles 1018 is smaller than the diameter D2 of the second increased diameter portion 1036 of the one or more spindles 1018.

Connecting the first increased diameter portion 1032 of the axially inboard end portion 1026 of the one or more spindles 1018 to the intermediate portion 1025 of the one or more spindles 1018 is an increasing diameter portion 1040. As illustrated in FIGS. 5, 5A and 5B of the disclosure, the diameter of the increasing diameter portion 1040 of the one or more spindles 1018 increases from the intermediate portion 1025 to first increased diameter portion 1032 of the one or more spindles 1018.

A second increasing diameter portion 1042 connects the second increased diameter portion 1036 of the axially inboard end portion 1026 of the one or more spindles 1018 to the third increased diameter portion 1038. As illustrated in FIGS. 5, 5A and 5B of the disclosure, the diameter of the increasing diameter portion 1042 increases from the second increased diameter 1036 to the third increased diameter portion 1038 of the one or more spindles 1018.

A radially protruding portion 1044 having an axially outboard surface 1046 and an axially inboard surface 1048 circumferentially extends radially outboard from at least a portion of the third increased diameter portion 1038 of the one or more spindles 1018. As a non-limiting example, the radially protruding portion 1044 is a brake flange. In accordance with an embodiment of the disclosure, the radially protruding portion 1044 includes one or more attachment apertures 1050 that extend from the axially outboard side 1046 to the axially inboard side 1048 of the radially protruding portion 1044. The one or more attachment apertures 1050 are of a size and a shape to receive and/or retain at least a portion of one or more mechanical fasteners 1052.

At least a portion of the axially outboard end portion 1024 of the one or more spindles 1018 is a reduced diameter portion 1054 having an axially outboard portion 1056 and an axially inboard portion 1058. As illustrated in FIGS. 5, 5A and 5B of the disclosure, at least a portion of the outer surface 1022 of the axially inboard portion 1058 of the reduced diameter portion 1054 of the one or more spindles 1018 is a second bearing journal 1060. The second bearing journal 1060 and the reduced diameter portion 1054 of the one or more spindles 1018 has a diameter D4. As illustrated in FIGS. 5, 5A and 5B of the disclosure, the diameter D4 of the second bearing journal 1060 of the one or more spindles 1018 is less than the diameter D1 of the first bearing journal 1034 of the one or more spindles 1018.

Axially outboard from and adjacent to the second bearing journal 1060 in the axially outboard portion 1056 of the reduced diameter portion 1054 is a threaded portion 1062. Circumferentially extending from at least a portion of the outer surface 1022 of the threaded portion 1062 are threads 1064 of a pre-determined pitch.

Disposed radially outboard from and adjacent to the first bearing journal 1034 is a first bearing 1074. As illustrated in FIGS. 5A and 25 of the disclosure, the first bearing 1074 has an inner face 1076, an outer race 1078 and a plurality of rolling elements 1080 disposed between the inner race 1076 and the outer race 1078 of the first bearing 1074. At least a portion of the inner race 1076 of the first bearing 1074 is in direct contact with the first bearing journal 1034 of the one or more spindles 1018 of the axle assembly 1000. As a non-limiting example, the first bearing 1074 is a wheel bearing and/or a tapered roller bearing. In accordance with an embodiment of the disclosure (not shown), at least a portion of the first bearing journal of the one or more spindles forms at least a portion of the inner race of the first bearing.

Radially outboard from and adjacent to the second bearing journal 1060 of the one or more spindles 1018 is a second bearing 1082. As illustrated in FIGS. 5A and 5B of the disclosure, the second bearing 1082 has an inner race 1084, an outer race 1086 and a plurality of rolling elements 1088 disposed between the inner race 1084 and the outer race 1086 of the second bearing 1082. As a non-limiting example, the second bearing 1082 is a wheel bearing and/or a tapered roller bearing. In accordance with an embodiment of the disclosure (not shown), at least a portion of the second bearing journal of the one or more spindles forms at least a portion of the inner race of the second bearing.

Interposed between the first bearing 1074 and the second bearing 1082 is a bearing spacer 1090 having an inner surface 1092, an outer surface 1094, an axially outboard end portion 1096 and an axially inboard end portion 1098. The inner surface 1092 and the outer surface 1094 of the bearing spacer 1090 defines a hollow portion 1100 therein. As illustrated in FIGS. 5A and 5B of the disclosure, at least a portion of the axially outboard end portion 1096 of the bearing spacer 1090 is in direct contact with at least a portion of the second bearing 1082. Additionally, at least a portion of the axially inboard end portion 1098 of the bearing spacer 1090 is in direct contact with at least a portion of the first bearing 1074. The bearing spacer 1090 is used to ensure that the first and second bearing 1074 and 1082 are assembled in the correct location and remain in the desired location during operation.

Radially outboard from the one or more spindles 1018 of the axle assembly 1000 is one or more wheel hubs 1102 having an inner surface 1104 and an outer surface 1106 defining a hollow portion 1108 therein. As illustrated in FIGS. 2A and 2B of the disclosure, at least a portion of the outer race 1078 of the first bearing 1074 is in direct contact with at least a portion of the inner surface 1104 of the one or more wheel hubs 1102. Additionally, at least a portion of the outer race 1086 of the second bearing 1082 is in direct contact with the inner surface 1104 of the one or more wheel hubs 1102. The first and second bearing 1074 and 1082 of the axle assembly 1000 allows for relative rotation between the one or more wheel hubs 1102 and the one or more spindles 1018 of the axle assembly 1000.

Disposed radially outboard from the threaded portion 1062 of the axially outboard end portion 1024 of the one or more spindles 1018 is a spindle nut 1110 having an inner surface 1112 and an outer surface 1114. Additionally, the spindle nut 1110 is disposed axially outboard from and adjacent to the second bearing 1082. Circumferentially extending from at least a portion of the inner surface 1112 of the spindle nut 1110 are threads 1116 of a pre-determined pitch. The threads 1116 on the inner surface 1112 of the spindle nut 1110 are complementary to the threads 1064 on the outer surface 1022 of the threaded portion 1062 of the axially outboard end portion 1024 of the one or more spindles 1018. The spindle nut 1110 is used to lock the first bearing 1074, the second bearing 1082, the bearing spacer 1090 and the wheel hub 1102 in place and keep the first bearing 1074, the second bearing 1082, the bearing spacer 1090 and the wheel hub 1102 from sliding off the one or more spindles 1018 when in operation.

According to the embodiment of the disclosure illustrated in FIG. 5A of the disclosure, at least a portion of the radially protruding portion 1044 of the one or more spindles 1018 is integrally connected to at least a portion of a torque plate 1118 of a disc brake assembly 1120. As a non-limiting example, the radially protruding portion 1044 is integrally connected to the torque plate 1118 by using one or more mechanical fasteners, one or more adhesives and/or one or more welds. In accordance with an embodiment of the disclosure and as a non-limiting example, the one or more welds are one or more gas metal arc welds and/or one or more energy beam welds such as a laser beam weld, an electron beam weld and/or an x-ray weld.

In accordance with an alternative embodiment of the disclosure illustrated in FIG. 5B, at least a portion of the radially protruding portion 1044 is integrally connected to at least a portion of a brake spider 1122 of a drum brake assembly 1124. As a non-limiting example, the radially protruding portion 1044 is integrally connected to the brake spider 1024 by using one or more mechanical fasteners, one or more adhesives and/or one or more welds. In accordance with an embodiment of the disclosure and as a non-limiting example, the one or more welds are one or more gas metal arc welds and/or one or more energy beam welds such as a laser beam weld, an electron beam weld and/or an x-ray weld.

Figure 6:
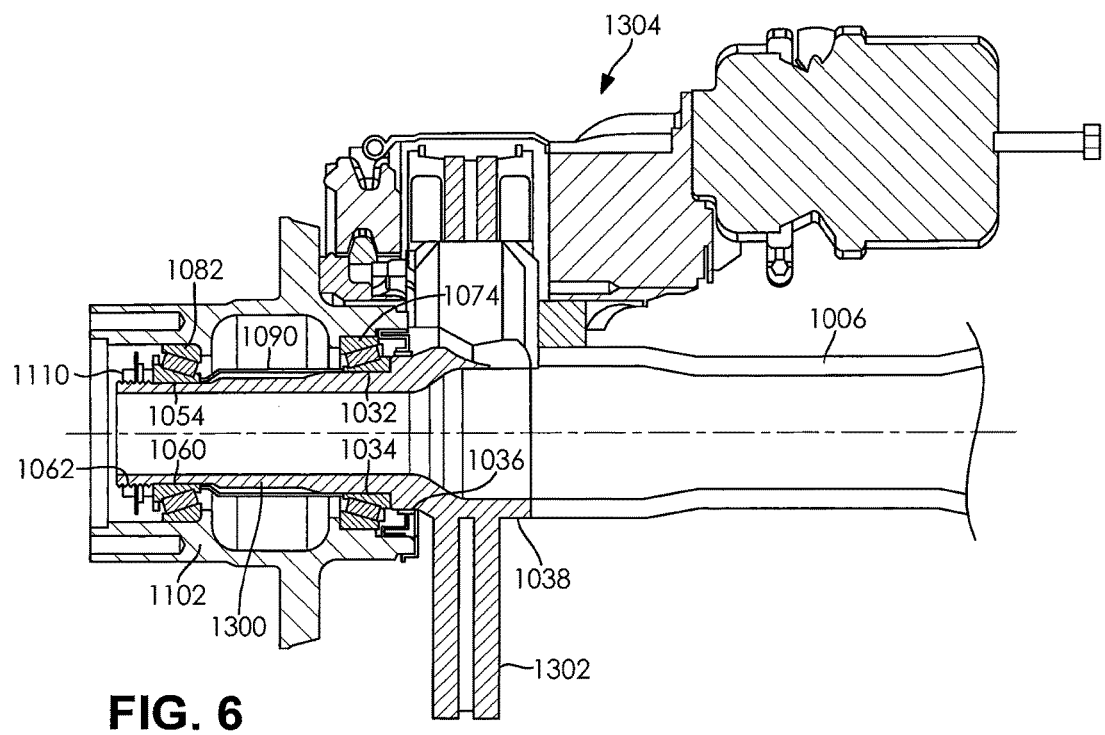
FIG. 6 is a cut-away schematic side-view of one or more spindles according to still another embodiment of the disclosure.

FIG. 6 is a cut-away schematic side-view of one or more spindles 1300 according to yet another embodiment of the disclosure. The one or more spindles 118 illustrated in FIGS. 5-5B of the disclosure are the same as the one or more spindles 1300 illustrated in FIG. 6, except where specifically noted below. Circumferentially extending radially outboard from at least a portion of the third increased diameter portion 1038 of the axially inboard end portion 1026 of the one or more spindles 1300 is a radially protruding portion 1302 of a disc brake assembly 1304. As a non-limiting example, the radially protruding portion 1302 on the third increased diameter portion 1038 of the one or more spindles 1300 is a torque plate. In accordance with this embodiment of the disclosure, the one or more spindles 1300 do not include the radially protruding portion 1044 illustrated in FIGS. 5-5B of the disclosure.

Figure 7:
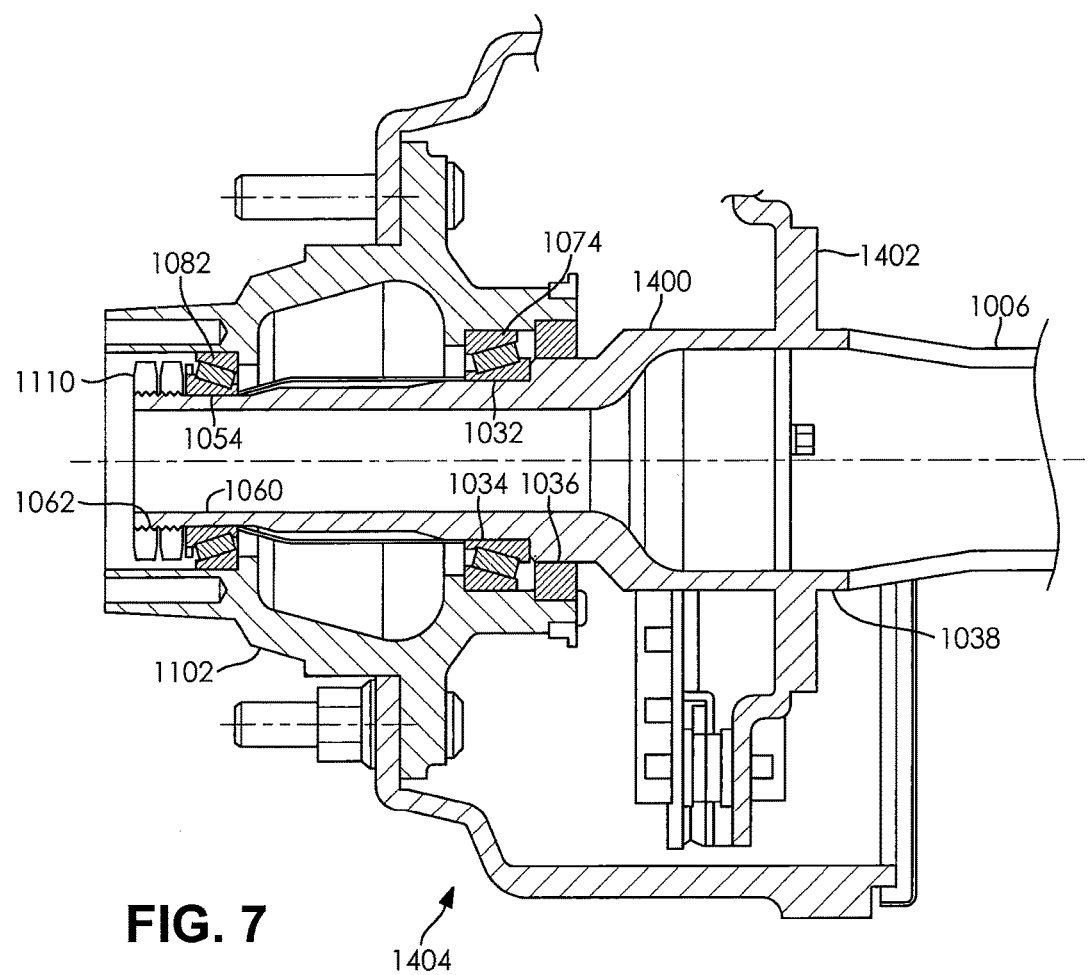
FIG. 7 is a cut-away schematic side-view of one or more spindles according to yet another embodiment of the disclosure.

FIG. 7 is a cut-away schematic side-view of one or more spindles according to yet another embodiment of the disclosure. The one or more spindles 1018 and 1300 illustrated in FIGS. 5, 5A, 5B and 6 of the disclosure are the same as the one or more spindles 1400 illustrated in FIG. 7, except where specifically noted below. Circumferentially extending radially outboard from at least a portion of the third increased diameter portion 1038 of the axially inboard end portion 1026 of the one or more spindles 1400 is a radially protruding portion 1402 of a drum brake assembly 1404. As a non-limiting example, the radially protruding portion 1402 on the third increased diameter portion 1038 of the one or more spindles 1400 is a brake spider. In accordance with this embodiment of the disclosure, the one or more spindles 1400 do not include the radially protruding portions 1044 and 1302 illustrated in FIGS. 5, 5A, 5B and 6 of the disclosure.

FIG. 8 is a flow-chart illustrating the method of attaching a spindle to an axle half haft housing 2000 according to an embodiment of the disclosure. In order to attach the spindle to the axle half shaft housing the first step is to provide a vehicle axle assembly with an axle housing having one or more axle half shaft housings 2002 and providing a spindle having one or more bearing journals and a radially protruding portion 2004. As a non-limiting example, the radially protruding portion of the spindle is a brake flange, a torque plate of a disc brake assembly and/or a brake spider of a drum brake assembly. It is within the scope of this disclosure that the step of providing the vehicle axle assembly with an axle housing having one or more axle half shaft housings 2002 and the step of providing the spindle having one or more bearing journals and a radially protruding portion 2004 may occur in any order.

After the spindle having one or more bearing journals and a radially protruding portion is provided 2002, the one or more bearing journals are ground 2006 and the one or more bearing journals are induction hardened 2008. The induction hardening process is used to heat treat the one or more bearing journals of the spindle by using an induction heating process. Once the one or more bearing journals have been heat treated using the induction heating process, the one or more bearing journals are quenched to undergo a martensitic transformation to increase the hardness of the one or more bearing journals. As result, the induction hardening process allows for the selectively hardening of portions of the spindle without affecting the properties of the spindle as a whole. By increasing the hardness of the one or more bearing journals in increases the overall life and durability of the spindle.

Additionally, after the spindle having one or more bearing journals and a radially protruding portion is provided 2002, one or more attachment apertures are drilled into the radially protruding portion of the spindle 2010 and a clocking angle for the radially protruding portion of the spindle is determined 2012. The clocking angle for the radially protruding portion of the spindle is used to determine the angular position of the braking assembly relative to the radially protruding portion. The one or more attachment apertures are used to attach a braking assembly component, such as a torque plate and/or a brake spider, to the radially protruding portion of the spindle. It is within the scope of this disclosure that the steps of grinding the one or more bearing journals 2006, induction hardening the one or more bearing journals 2008, drilling one or more attachment apertures 2010 and determining the clocking angle 2012 may occur in any order.

Once the clocking angle has been determined 2012, the radially protruding portion of the spindle is aligned to the determined clocking angle 2014. After the radially protruding portion of the spindle has been aligned to the determined clocking angle 2014 the spindle is attached to the axle half shaft housing of the axle housing 2016 using one or more welds. As a non-limiting example, the one or more welds are one or more gas metal arc welds and/or one or more energy beam welds such as a laser beam weld, an electron beam weld and/or an x-ray weld. The energy beam welds, such as the laser beam welds, are a low to no distortion welding process which eliminates the need for any post welding straightening processes thereby reducing the overall time, complexity and cost associated with the assembly and manufacturing of the drive axle assembly. Additionally, the energy beam welds, such as the laser beam welds, allow the spindle to be held at the desired clocking angle while the welding machine attaches the spindle to the axle half shaft housing. As a result, the energy beam welds reduce the clocking angle complexity commonly associated with conventional friction welding processes, which reduces the overall time, complexity and cost associated with the assembly and manufacturing of the drive axle assembly. Furthermore, the energy beam welds, such as the laser beam welds, allow a single piece spindle with pre-ground bearing journals and a fully machined flange to be attached directly to an axle half shaft housing. As a result, the method of attaching a spindle to an axle half haft housing 2000 allows a fully machined and finished spindle to be attached directly to an axle half shaft housing.

Finally, after the spindle is attached to the axle half shaft housing 2016 a non-rotatable braking component is attached to the radially protruding portion of the spindle 2018. According to an embodiment of the disclosure and as a non-limiting example, the non-rotatable braking component of the braking assembly is attached to the radially protruding portion of the spindle using one or more mechanical fasteners, one or more adhesives and/or one or more welds. As a non-limiting example, the one or more welds are one or more gas metal arc welds and/or one or more energy beam welds such as a laser beam weld, an electron beam weld and/or an x-ray weld.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. A method of attaching a spindle to an axle half shaft housing comprising:
    providing a spindle, said spindle comprising an inner surface, an outer surface, an axially outboard end portion, an axially inboard end portion, one or more bearing journals on said outer surface of said spindle, and a radially protruding portion circumferentially extending from at least a portion of said outer surface of said axially inboard end portion of said spindle;
    providing an axle half shaft housing, said axle half shaft housing comprising an inner surface, an outer surface an axially outboard end portion, and an axially inboard end portion;
    grinding said one or more bearing journals on said outer surface of said spindle;
    determining a clocking angle for said radially protruding portion of said spindle;
    aligning said radially protruding portion of said spindle to said determined clocking angle; and
    attaching said axially inboard end portion of said spindle to said axially outboard end portion of said axle half shaft housing with one or more energy beam welds.

2. The method of attaching a spindle to an axle half shaft housing of claim 1, wherein said one or more energy welds is a laser beam weld, an electron beam weld and/or an x-ray weld.

3. The method of attaching a spindle to an axle half shaft housing of claim 1, wherein said radially protruding portion of said spindle is a brake flange, a torque plate or a brake spider.

4. The method of attaching a spindle to an axle half shaft housing of claim 1, further comprising the step of induction hardening said one or more bearing journals of said spindle.

5. The method of attaching a spindle to an axle half shaft housing of claim 1, further comprising the step of drilling one or more attachment apertures into said radially protruding portion.

6. The method of attaching a spindle to an axle half shaft housing of claim 1, further comprising the step of attaching a torque plate of a disc brake assembly to at least a portion of said radially protruding portion of said spindle.

7. The method of attaching a spindle to an axle half shaft housing of claim 6, wherein said torque plate of said disc brake assembly is attached to said radially protruding portion of said spindle by using one or more energy welds.

8. The method of attaching a spindle to an axle half shaft housing of claim 1, further comprising the step of attaching a brake spider of a drum brake assembly to at least a portion of said radially protruding portion of said spindle.

9. The method of attaching a spindle to an axle half shaft housing of claim 8, wherein said brake spider of said drum brake assembly is attached to said radially protruding portion of said spindle by using one or more energy beam welds.

10. A spindle assembly comprising:
    a spindle having an inner surface, an outer surface, an axially outboard end portion, an axially inboard end portion;
        wherein said inner surface and said outer surface of said spindle defines a hollow portion therein;
        wherein said axially inboard end portion of said spindle comprises a first bearing journal, a first increased diameter portion, a second increased diameter portion, and a radially protruding portion;
        wherein said second increased diameter portion of said spindle is disposed axially inboard from and adjacent to said first increased diameter portion of said spindle;
        wherein said radially protruding portion of said spindle circumferentially extends from at least a portion of said outer surface of said second increased diameter portion of said spindle;
        wherein said first bearing journal is disposed adjacent to and axially outboard from said first increased diameter portion of said spindle;
        wherein said axially outboard end portion of said spindle comprises a threaded portion, and a second bearing journal; and wherein said second bearing journal is disposed adjacent to and axially inboard from said threaded portion of said spindle.

11. The spindle of claim 10, wherein said first bearing journal has a diameter D1 and said second bearing journal has a diameter D2; and
wherein said diameter D1 of said first bearing journal is substantially the same as said diameter D2 of said second bearing journal.

12. The spindle of claim 10, wherein said radially protruding portion of said spindle is a torque plate or a brake spider.

13. The spindle of claim 10, wherein said radially protruding portion of said spindle is a brake flange.

14. The spindle of claim 13, wherein said brake flange of said spindle is integrally connected to at least a portion of a torque plate or a brake spider by using one or more energy beam welds.

15. A spindle assembly comprising:
a spindle having an inner surface, an outer surface, an axially outboard end portion, an axially inboard end portion;
wherein said inner surface and said outer surface of said spindle defines a hollow portion therein;
wherein said axially inboard end portion of said spindle comprises a first bearing journal, a first increased diameter portion, a second increased diameter portion, a third increased diameter portion, and a radially protruding portion;
wherein said second increased diameter portion of said spindle is disposed axially inboard from and adjacent to said first increased diameter portion of said spindle;
wherein said third increased diameter portion of said spindle is disposed axially inboard from and adjacent to said second increased diameter portion of said spindle;
wherein said radially protruding portion of said spindle circumferentially extends from at least a portion of said outer surface of said third increased diameter portion of said spindle;
wherein at least a portion of said outer surface of said first increased diameter portion of said spindle comprises said first bearing journal;
wherein said axially outboard end portion of said spindle comprises a threaded portion, a second bearing journal, and a reduced diameter portion;
wherein said reduced diameter portion of said axially outboard end portion of said spindle has an axially outboard portion and an axially inboard portion;
wherein at least a portion of said axially outboard portion of said reduced diameter portion of said spindle has said threaded portion; and
wherein said second bearing journal is disposed axially inboard from and adjacent to said threaded portion of said spindle.

16. The spindle of claim 15, wherein said first bearing journal has a diameter D1 and said second bearing journal has a diameter D2; and
Wherein said diameter D1 of said first bearing journal is larger than said diameter D2 of said second bearing journal.

17. The spindle of claim 15, wherein said radially protruding portion of said spindle is a torque plate or a brake spider.

18. The spindle of claim 15, wherein said radially protruding portion of said spindle is a brake flange.

19. The spindle of claim 18, wherein said brake flange of said spindle is integrally connected to at least a portion of a torque plate or a brake spider by using one or more energy beam welds.

* * * * *